M. MATHY.
HEAT ECONOMIZER AND REGENERATOR.
APPLICATION FILED JUNE 26, 1919.
1,370,984.
Patented Mar. 8, 1921.
6 SHEETS—SHEET 1.
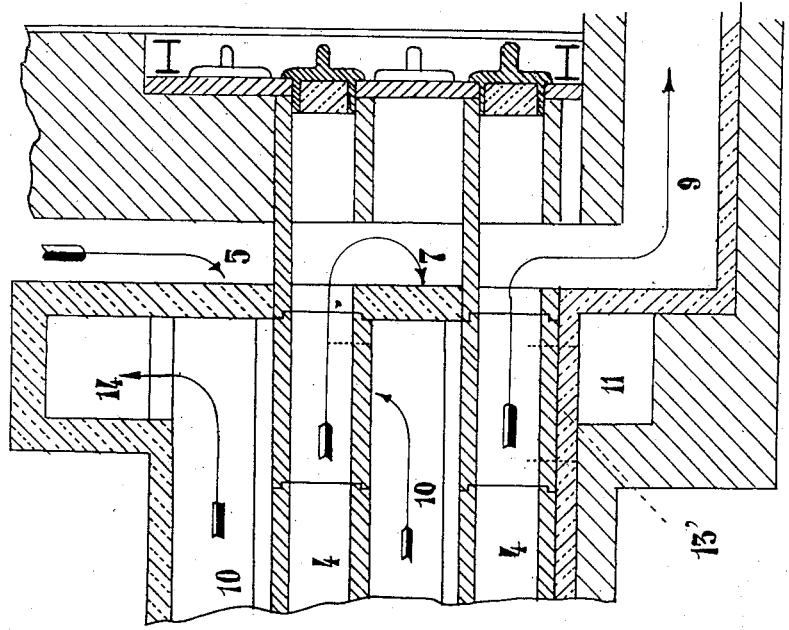
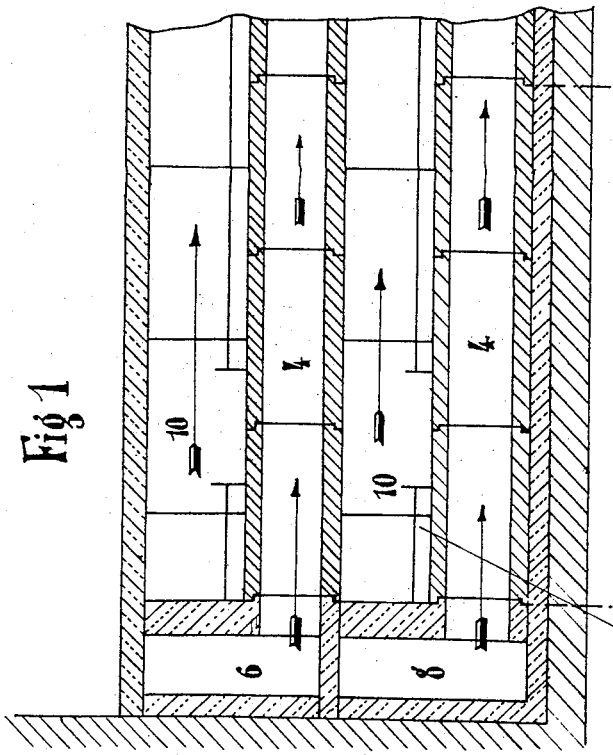
Fig 1
INVENTOR.
Maurice Mathy.
By Laurence Langner
Attorney.

M. MATHY.
HEAT ECONOMIZER AND REGENERATOR.
APPLICATION FILED JUNE 26, 1919.

1,370,984.

Patented Mar. 8, 1921.
6 SHEETS—SHEET 2.

INVENTOR.
Maurice Mathy.
By Laurence Langner
Attorney.

M. MATHY.
HEAT ECONOMIZER AND REGENERATOR.
APPLICATION FILED JUNE 26, 1919.
1,370,984.
Patented Mar. 8, 1921.
6 SHEETS—SHEET 3.
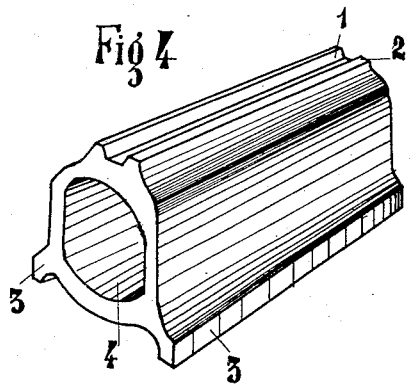
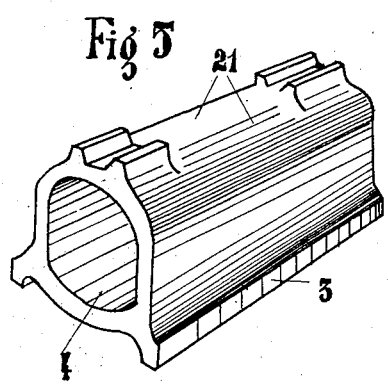
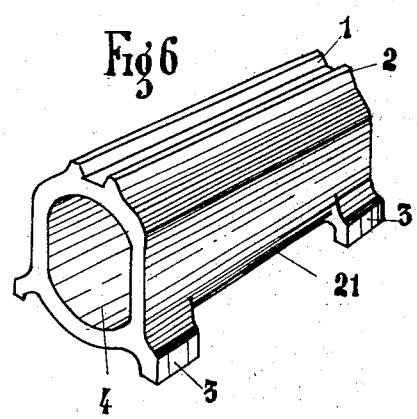
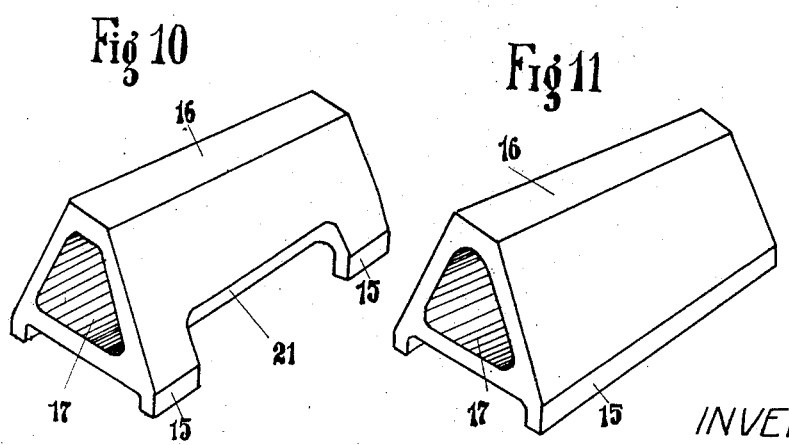
INVENTOR.
Maurice Mathy
By
Laurence Laugier
Attorney.

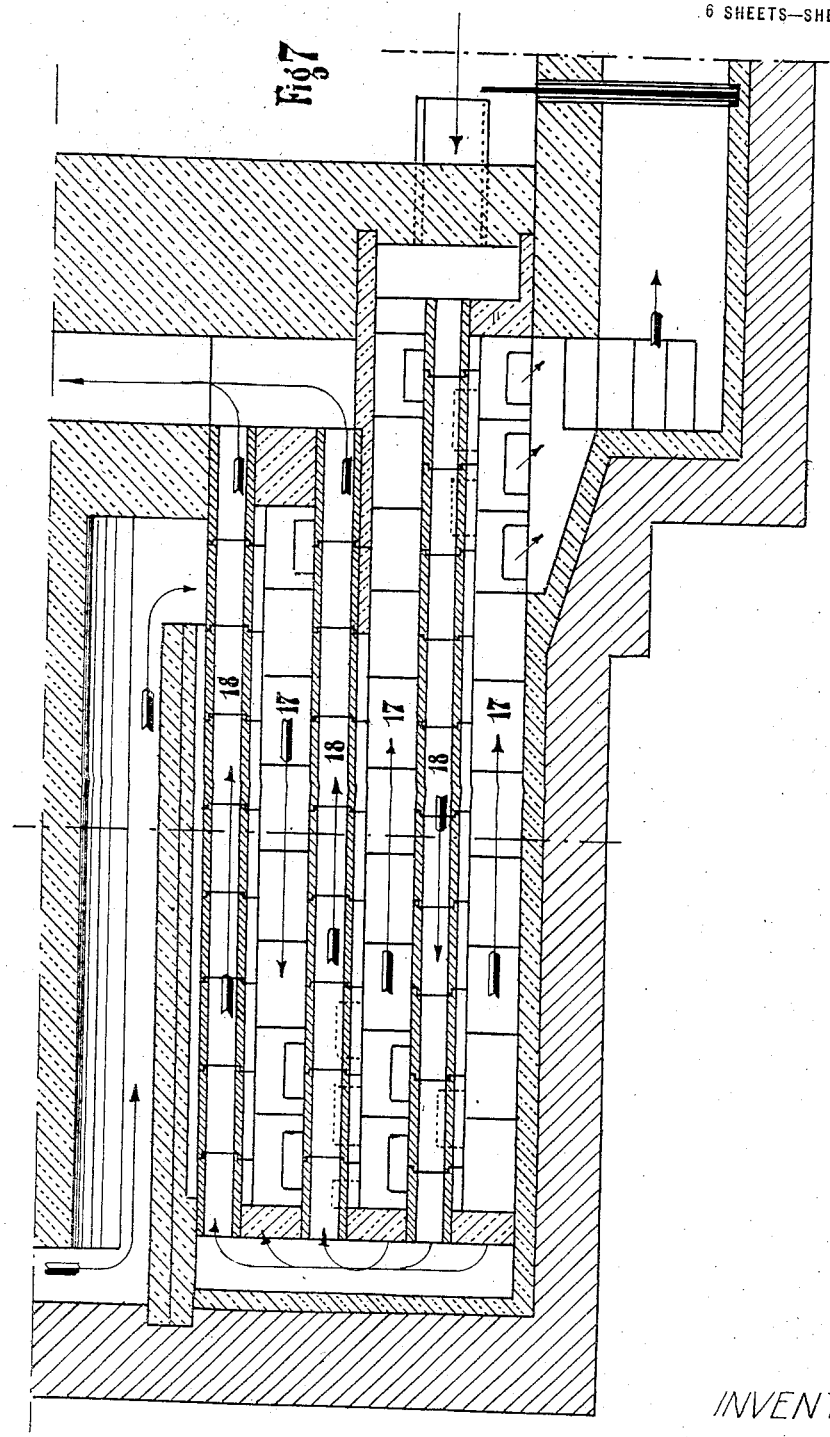

M. MATHY.
HEAT ECONOMIZER AND REGENERATOR.
APPLICATION FILED JUNE 26, 1919.

1,370,984.

Patented Mar. 8, 1921.
6 SHEETS—SHEET 5.

INVENTOR.
Maurice Mathy.
By Laurence Laugner
Attorney.

M. MATHY.
HEAT ECONOMIZER AND REGENERATOR.
APPLICATION FILED JUNE 26, 1919.
1,370,984.
Patented Mar. 8, 1921.
6 SHEETS—SHEET 6.
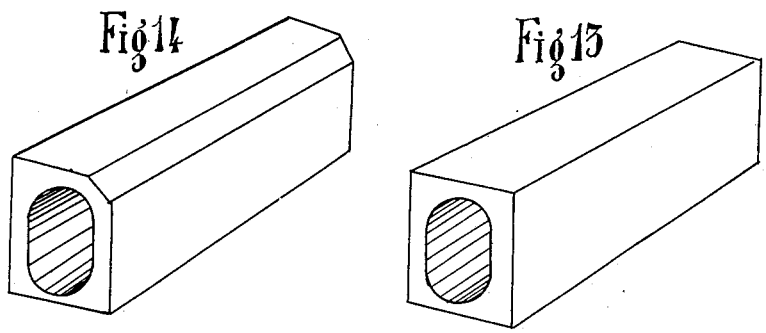
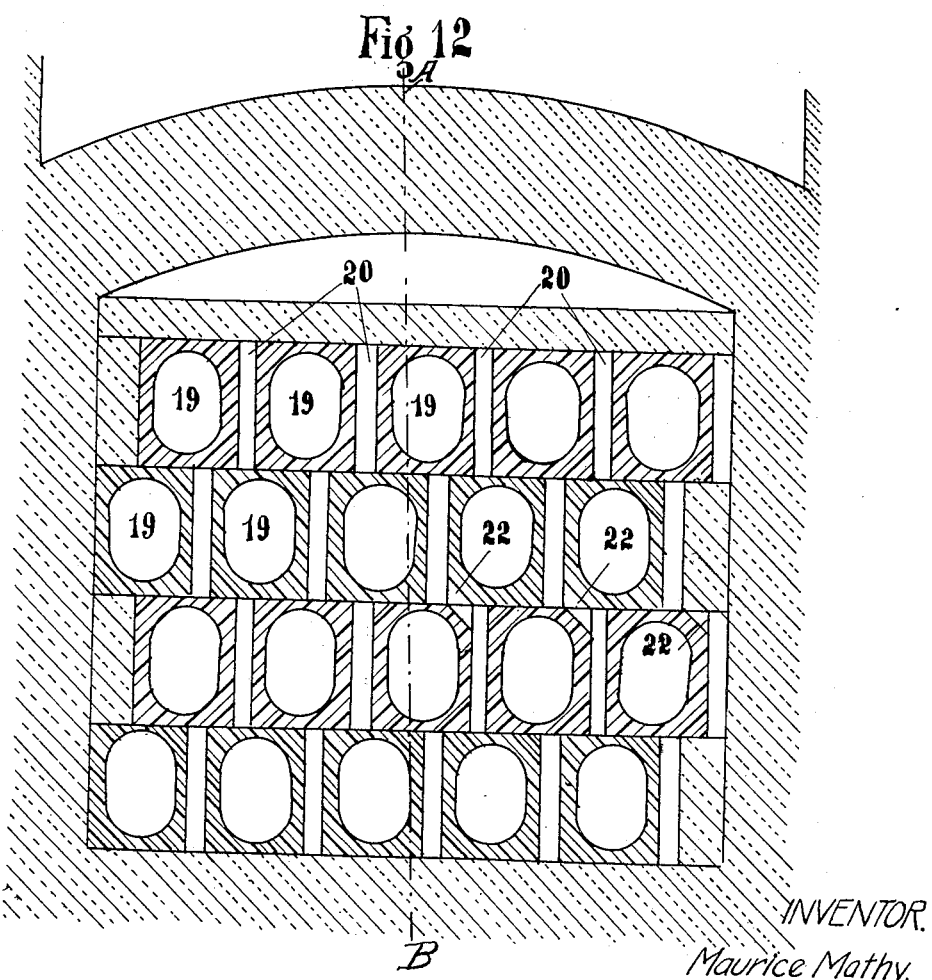
INVENTOR.
Maurice Mathy.
By his Attorney.

UNITED STATES PATENT OFFICE.

MAURICE MATHY, OF LIEGE, BELGIUM.

HEAT ECONOMIZER OR REGENERATOR.

1,370,984.     Specification of Letters Patent.     Patented Mar. 8, 1921.

Application filed June 26, 1919. Serial No. 307,028.

*To all whom it may concern:*

Be it known that I, MAURICE MATHY, manufacturer, a subject of the King of Belgium, and resident of Liege, in the Kingdom of Belgium, have invented certain new and useful Improvements in and Relating to Heat Economizers or Regenerators; and I do hereby declare the following to be a full, clear, and exact description of the invention, such as will enable others skilled in the art to which it appertains to make and use the same, reference being had to the accompanying drawings and to letters or figures of reference marked thereon, which form a part of this specification.

This invention relates to improvements in heat economizer regenerators (superheaters) in which the current of fluid passes through or around tubes of ceramic material, the hot fluid flowing inversely around or through the said tubes.

Known economizers or regenerators of this kind are formed of comparatively long tubes. Such tubes are difficult and expensive to manufacture and are liable to be broken either when being placed in position or during the working of the apparatus.

In order to give them sufficient strength, it is necessary, owing to their great length, to give them considerable thickness, the effect of which is to render the exchanges of heat imperfect.

These various disadvantages are avoided in this invention by forming the tubes of superimposed sections provided with holes or bores so as to thereby obtain a series of parallel passages.

The short length of the sections and the multiple points of support by reason of their superimposition enable them to be made comparatively thin.

The passages necessary for the circulation of one of the fluids around these passages are obtained either by a suitable superimposition of the elements or by providing them with longitudinal ribs or corrugations insuring an opening between the elements, which forms these passages. In order to permit communication between the various tiers of passages of a kind, at the ends of the heat exchanger, certain of these elements are specially formed so as to effect such communication by reason of their being superimposed.

When the elements are provided with the longitudinal ribs or corrugations hereinbefore mentioned, such ribs are partially dispensed with in the case of the special elements just mentioned.

In section, these elements may be of very varied forms. Some are illustrated by way of example in the accompanying drawings in which:

Figures 1 to 6 relate to one form of construction,

Figs. 7 to 11 to a second, and

Figs. 12 to 14 to a third.

Fig. 1 is a longitudinal section of the first form of heat economizer or recuperator.

Figure 2:
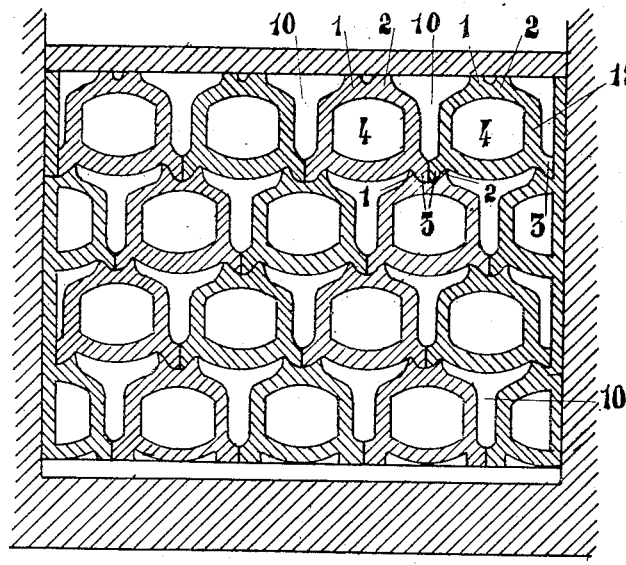
Fig. 2 is a transverse section of the same.
Figure 3:
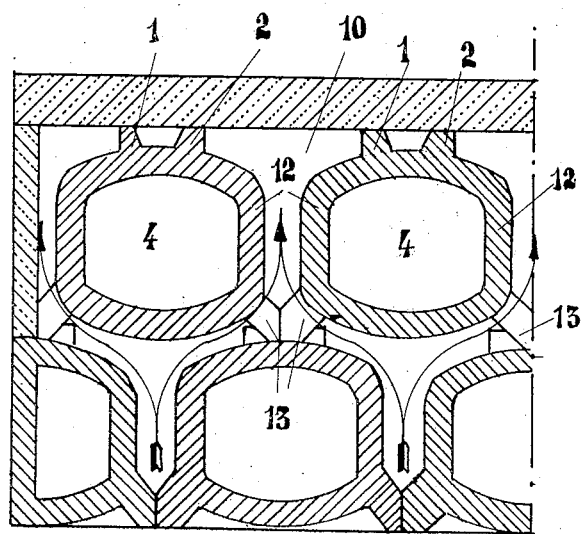

Fig. 3 a transverse section on an enlarged scale of the end of the economizer.

Figs. 4, 5 and 6 are views in perspective of various blocks constituting the first type of elements.

Fig. 7 is a longitudinal section of the second form of superheater or economizer.

Figure 8:
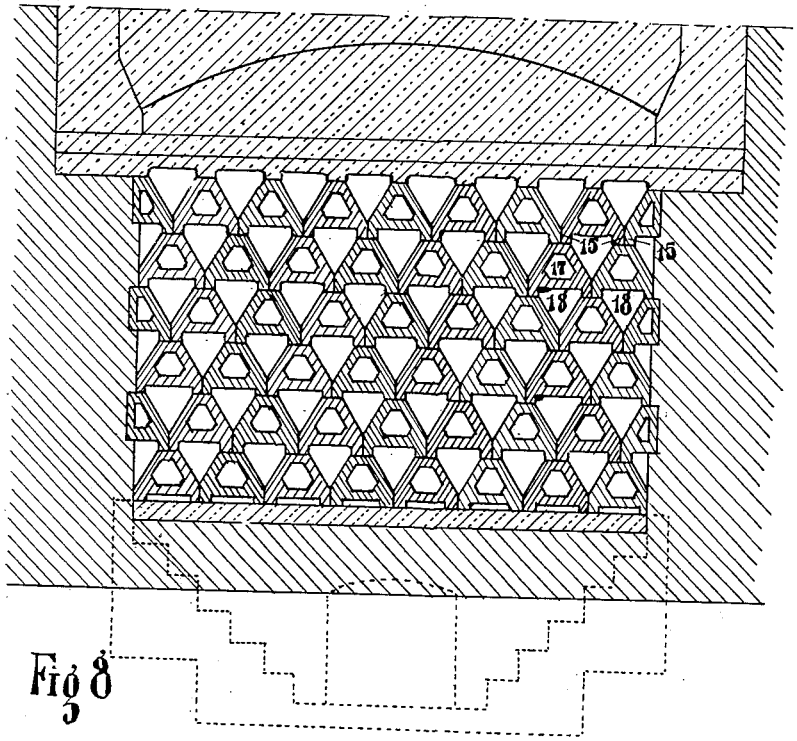

Fig. 8 is a transverse section.

Figure 9:
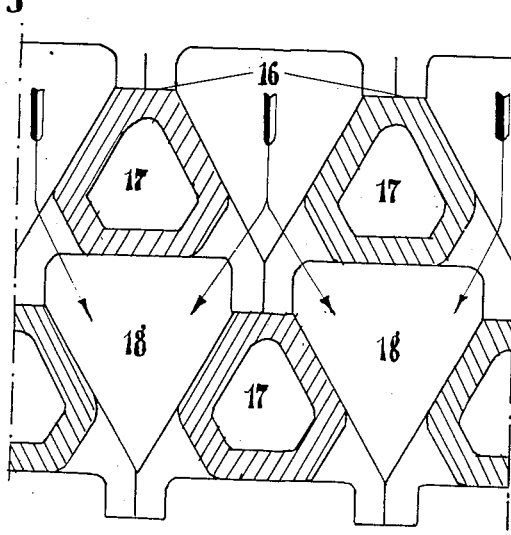

Fig. 9 is a transverse section on an enlarged scale of the end of the economizer.

Figs. 10 and 11 are views in perspective of various blocks constituting the second type.

Fig. 12 is a transverse section of the third form of economizer. The left hand part of this figure is a section toward the middle of the economizer and the right hand part is a section at one of the ends, the dividing line between the two sections being indicated at A—B.

Figs. 13 and 14 are views in perspective of various blocks constituting the third type of elements.

The economizer according to the first form, Figs. 1 to 6, is composed of elements with curved walls and provided at their upper part with two adjacent ribs or corrugations 1 and 2 and at each of the corners of their lower part with a flange or rib 3, the cross-sectional shape or outline of said elements being such that it can be inscribed, geometrically speaking, in a rectangle. The elements are superimposed (see Figs. 2 and 3) in such a way that the ribs 3 of two adjacent elements engage between the ribs 1 and 2 of one element of the next lower tier. All these elements are arranged in such a way that the holes 4 with which they are provided form passages (see Fig. 1) through which the hot gases circulate. Thus, as is shown in Fig. 1, these gases are led in the passage 5, pass through the passages 4 of the upper tier, enter a vertical passage 6, pass through the passages 4 of the second tier, enter a vertical passage 7, pass through the passages 4 of the third tier, enter a vertical passage 8 and go to the flue 9 of the chimney by the passages 4 of the bottom tier.

The air to be heated circulates in the spaces 10 left free between the elements.

These air passages are limited on the one hand by the walls 12 of the elements and on the other hand by the ribs 1, 2 and 3. At places where it is necessary to make a connection between the spaces 10 of two tiers, elements are employed which have partial ribs, that is to say they are provided with notches or recesses 21 such as are shown in Figs. 5 and 6, so as to leave at 13 the desired passages (see Fig. 3).

The air to be heated is brought to the superheater by a flue 11 and enters the superheater by the passages 13' of the first tier of elements, passes through the passages 10 of this first tier, then through the passages 13" into the second tier and so on successively up to the exit flue 14.

In the second form illustrated in the drawings the elements have a generally triangular shape and are only provided with ribs 15 at the ends of their bases. When they are superimposed the adjoining ribs of the two adjacent elements rest on flat surface 16 of an element of the next lower tier.

In this second form (see Fig. 7) the gas and air only make a single passage in each direction, and in each of these directions the gas passes through the passages formed by the junction of the bores 17 of the successive elements, and the air through the passages 18 left free between the elements of those two tiers.

The third form differs from the two foregoing ones by the absence of ribs or flanges. These elements are formed in this case of blocks of rectangular section having axial bores or holes 19, and the passages 20 necessary for the passage of the air are obtained by leaving spaces between the blocks at the time when the latter are superimposed.

The air passages from one tier to another are obtained by using elements, such as are particularly shown in Fig. 14, at the places of the superheater where these passages are to be formed, and in these elements one corner is beveled. Passages 22, such as are shown on the right hand side of Fig. 12, are thus obtained.

What I claim is:

1. A ceramic superheater or heat economizer in which the fluids circulate parallelly, comprising a series of superimposed tiers of elements having axial openings and so arranged as to form flues for the passage of one fluid therethrough, and to leave between them flues for the passage of the other fluid, and means providing communication between the first-named flues of each tier of elements; certain of said elements having means providing communication between the second-named flues.

2. A ceramic superheater or heat economizer, comprising superimposed tiers of elements formed with internal flues for the circulation of one fluid therethrough, said elements being arranged to provide flues external to the elements themselves and through which the other fluid circulates in a direction parallel to the first fluid; the elements of each tier being provided at their bottoms with two longitudinal ribs which rest on the elements of the next lower tier, the ribs of certain of the elements having portions thereof removed to provide communication between the external flues.

3. A ceramic superheater or heat economizer, comprising superimposed tiers of elements formed with internal flues for the circulation of one fluid therethrough, said elements being arranged to provide flues external to the elements themselves and through which the other fluid circulates in a direction parallel to the first fluid; the elements of each tier being provided at their bottoms with two longitudinal ribs which rest on the elements of the next lower tier, and being provided at their tops with two longitudinal ribs between which the bottom ribs of two adjoining elements of the next higher tier are engaged, the ribs of certain of the elements having portions thereof removed to provide communication between the external flues.

In testimony whereof I affix my signature in presence of two witnesses.

MAURICE MATHY.

Witnesses:
 LEONARD LEVER,
 GEORGE VANDER HAEYTEN.